Oct. 22, 1929.  A. PRELESNIK  1,733,073
TROLLEY POLE
Filed Jan. 23, 1928  3 Sheets-Sheet 1
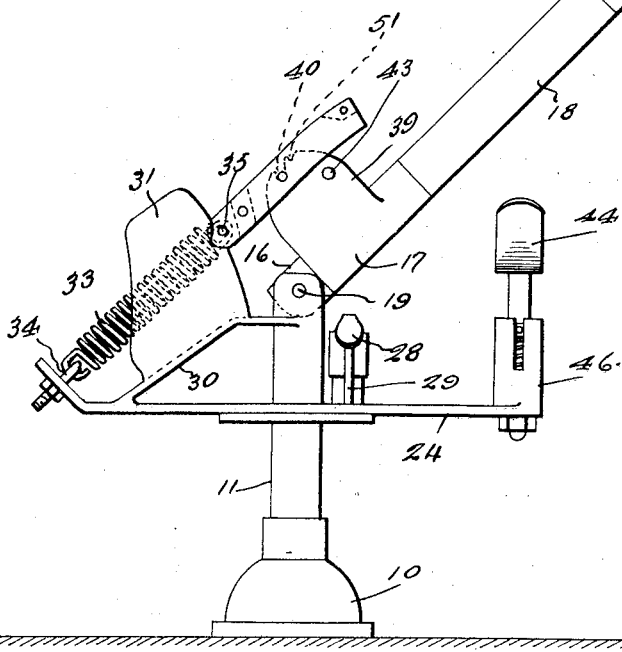
Anton Prelesnik
INVENTOR Oct. 22, 1929.  A. PRELESNIK  1,733,073
TROLLEY POLE
Filed Jan. 23, 1928  3 Sheets-Sheet 2
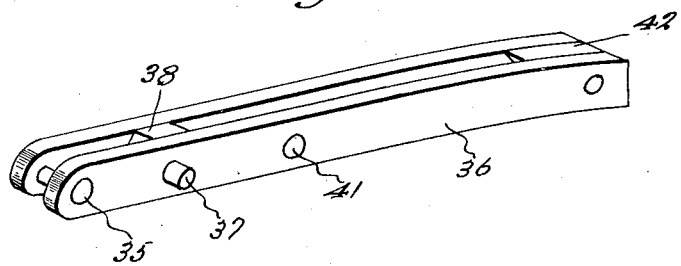
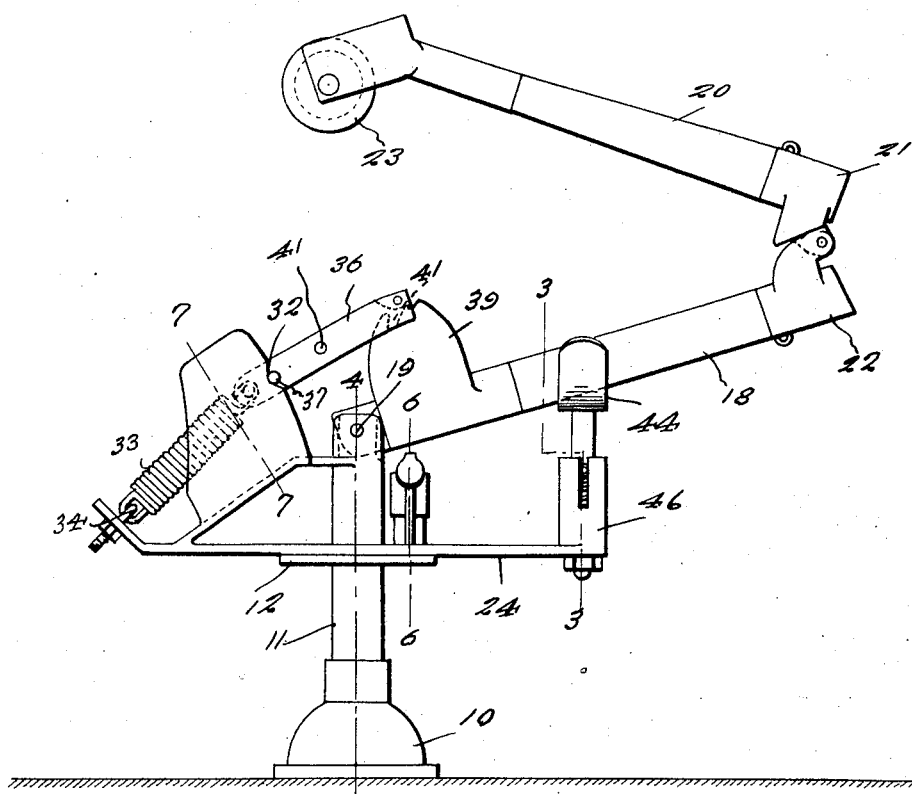
Anton Prelesnik
INVENTOR
WITNESS:  ATTORNEY Oct. 22, 1929.  A. PRELESNIK  1,733,073
TROLLEY POLE
Filed Jan. 23, 1928  3 Sheets-Sheet 3
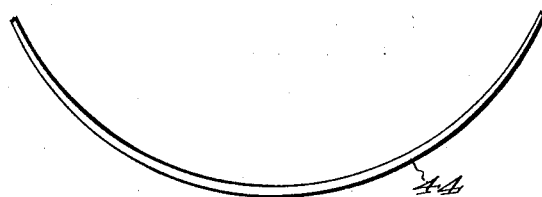
Fig. 3.
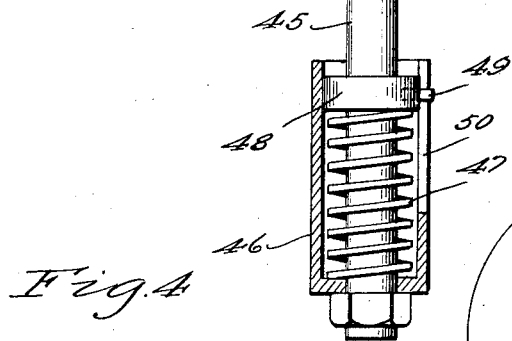
Fig. 4.
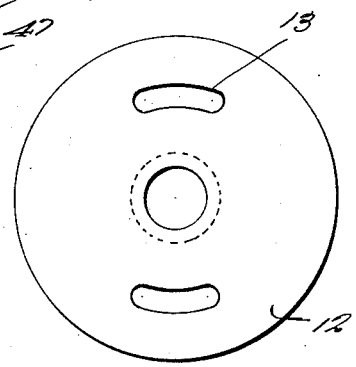
Fig. 5.
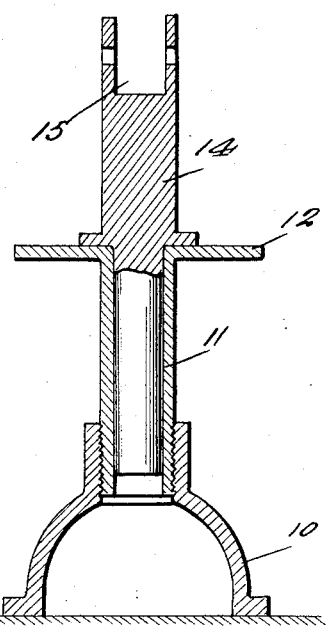
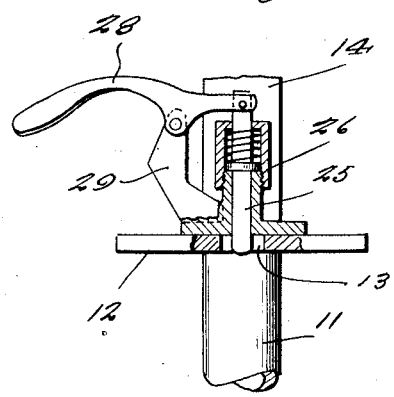
Fig. 6.
Anton Prelesnik
INVENTOR Patented Oct. 22, 1929

1,733,073

UNITED STATES PATENT OFFICE

ANTON PRELESNIK, OF MILWAUKEE, WISCONSIN

TROLLEY POLE

Application filed January 23, 1928. Serial No. 248,824.

This invention has relation to trolley poles and mountings therefor.

An object of the invention comprehends means adapted to permit limited lateral movement of the pole to follow the power line when the car sways while rounding bends.

Another object of the invention contemplates a break for the pole.

A further object of the invention embodies a trip mechanism adapted for use in conjunction with the pole to release the latter from an operative position when the pole encounters high and low spots in the power line.

An additional object of the invention consists of a cushion member located in the path of movement of the pole to catch the latter upon its descent.

With the above and other objects in view, the invention further consists of the following novel features and details of construction, to be hereinafter more fully described, illustrated in the accompanying drawings and pointed out in the appended claims.

In the drawings:—

Figure 1 is an elevation of my invention while in use.

Figure 2 is a similar view when the pole is broken and released for engagement with the cushion.

Figure 3 is a sectional view taken on line 3—3 of Figure 2.

Figure 4 is a vertical sectional view taken on line 4—4 of Figure 2.

Figure 5 is a top plan view of the turn table.

Figure 6 is a vertical sectional view taken through a locking means for the turn table.

Figure 7 is a sectional view taken on line 7—7 of Figure 2 through the trip mechanism omitting the spring.

Figure 8 is a perspective view of the release apparatus embodied in the trip mechanism.

It is generally known in the use of overhead power lines that the harps carried upon trolley poles frequently become disengaged from the current or power lines when encountering high or low spots therein. When a trolley pole becomes disengaged, the same flies up and is likely to strike against cross arms or rafters, as in the instance of mine trolleys. In the event the pole strikes the power line, short circuits are likely to occur which will ground the chassis of the car and endanger the lives of occupants thereof.

To overcome these grave difficulties as generally experienced, I provide a base 10 having a standard 11. A flange 12, carried by the standard 11 and having elongated slotted portions 13 upon diametrically opposite sides thereof, is adapted to provide a turn table, the purpose of which will be presently apparent.

A fulcrum shaft 14, upstanding from the standard 11 and centrally of the turn table 12, terminates to provide a bifurcated extremity 15. An ear 16, projected from a housing 17, carrying a trolley pole section 18, is pivotally mounted, as indicated at 19, within said bifurcations 15. A pole section 20, having a knuckle joint 21 upon one end, is adapted for pivotal connection with a complemental knuckle joint 22, carried upon the adjacent end of the pole section 18. A trolley wheel or harp 23 is carried upon the remaining end of the trolley pole section 20.

A plate member 24, adapted to receive the upstanding fulcrum shaft 14 therein, is mounted for rotary movement upon the turn table 12. A spring detent locking plunger 25, operable within a housing 26, upstanding from the plate member 24, is adapted for connection at the uppermost end thereof with a locking lever 28, pivotally mounted upon an ear 29 in the manner as best illustrated in Figure 6 of the drawings. The plunger 25 is adapted for reception within either one of the elongated slotted portions 13 in the turn table 12. The elongated slots permit of the limited lateral movement to the harp to follow the sway of the trolley line. The plate member 30, establishing connection between the plate member 24 and upstanding fulcrum shaft 14, supports side flanges 31 upon the side edges thereof. The forward side edges of said flanges 31 have portions removed or pockets, such as indicated at 32, the purpose of which will be presently apparent. A retractile spring 33, adapted for connection at one end with a U-bolt 34, carried upon one end of the plate member 24, is adapted for connection at its opposite end with a pin member 35, establishing connection between the side walls of a trip mechanism 36. A laterally projecting pin 37, having its extremities extending for appreciable distances beyond the side walls of the trip mechanism 36, is adapted to retain a block 38 therein, the purpose of which will be presently apparent. The pin 37 is adapted for selective reception at its ends within the portions removed or pockets 32 in the adjacent portions of the flanges 31.

An ear 39, upstanding from the housing 17, is provided with a pocket 40, adapted to receive a stud 41 within the trip mechanism 36.

A guide member 42, mounted within the forward end of the trip mechanism 36, is adapted for engagement with the ear 39 when the same is shifted for use in conjunction therewith. Studs 43, carried by the ear 39, are adapted to cooperate with the pocket 40, while engaged with the trip mechanism, as best illustrated in Figure 1 of the drawings. Thus far, from the foregoing description and accompanying drawings, it is to be noted that I have provided a trolley pole apparatus which may be swung to occupy reverse directions to permit retrograde movement of the vehicle without turning the latter around. It is to be noted that the knuckle joint, as provided between the trolley pole sections, will break the pole at the joint when the car encounters low spots in the road bed. The reverse action of the spring 33 will cause the studs 43 to lift the trip mechanism 36 upon the underside thereof to release the pin 41 from the pocket 40 in the ear 39. The trolley pole sections, already folded or knocked down will fall within and upon an arm 44 having a shaft 45 extended within a housing 56. A compression spring 47, mounted within the housing 46, is frictionally engaged with a collar member 48, carried by the shaft 45 within the housing 46. The trolley pole sections, when released from the trip mechanism, will fall upon the arm 44 and the shock of their descent will be checked by the spring 47. A pin 49, projecting from the collar 48, is extended within a vertically disposed slot 50 and the housing 46 to prevent lateral shifting movement of the arm 44, whereby the latter will be always located in the path of movement of the trolley pole sections when descending.

The invention will prove highly advantageous to mining concerns who install temporary trolley lines which are not generally straight and the high and lower spots in the road bed make the ordinary pole jump away from the trolley against beams and rafters, throwing splinters therefrom in the vicinity of motormen and brakemen, thereby making their positions dangerous and endangering the men to the possibility of a shock, if the pole should drag against the current wire.

As best illustrated in Figure 1 of the drawings, the ear 39 is in addition provided with a projection 51, extended for an appreciable distance higher than the pocket 40. This projection is adapted to engage the pin 41 when the trolley pole section 20 folds upon the pole section 18. Such movement releases the pin 41 from the projection 51 and due to the fact that the projection is located at a higher level than the pocket 40, downward swinging movement of the folded sections of the trolley pole will carry the ear 39 past the pin 41 and repose upon the arm 44.

The invention may be properly termed a safety device, in that the pole is adapted to break in the mid section after leaving the current wire and automatically drops on a cushion and is absolutely out of the way of the current wire or other obstructions that occur in electric line building. Also, the lives of the operators of the trolley cars are not endangered when the car is run in a forward or reverse motion as the pole is adapted to be turned in as small an area as the width of the area within which the car may operate. When the trolley pole breaks, it falls upon the spring cushion and can not swing around, knocking the motorman off the car, because the locking device prevents undue lateral shifting movement of the plate member upon the turn table.

If, by chance, the operator or brakeman of the car forgets to swing the pole around when backing up, the pole automatically breaks and will not work with the pulley or harp facing him.

The pole upon being arranged in position for use is automatically locked whereby the pole will run upon the line but in the event the pole leaves the line, for any cause, the pole will swing for an appreciable distance above the line causing the trip mechanism to release and the momentum attained will be sufficient to swing the pole sections upon the hinge connection whereby the whole assembly will fall upon the arm 44 in an out of the way position.

The invention is susceptible of various changes in its form, proportions and minor details of construction, and the right is herein reserved to make such changes as properly fall within the scope of the appended claims.

Having described the invention, what is claimed is:—

1. A trolley pole construction comprising a turn table, a plate member rotatably mounted thereon, a sectional pole mounted upon the turn table above said plate, a trip mechanism located adjacent the pole mounting and adapted for connection therewith to normally sustain the pole in position for use, a spring member establishing connection between the plate member and trip mechanism adapted to yieldingly retain the pole in the aforementioned position and to cooperate with the pole to automatically occupy an inoperative position when the pole leaves the trolley line, and means for lockingly engaging the plate member with the turn table.

2. A trolley pole construction comprising a base having a standard, a turn table carried by the standard, a fulcrum shaft mounted upon the turn table, a sectional pole mounted upon the fulcrum shaft, an ear projected from the mounting and having a pocket therein, a trip mechanism located adjacent said mounting and having a pin adapted for reception within said pocket to normally sustain the trolley pole in position for use, a plate member rotatably mounted upon the turn table, a retractile spring establishing connection between the plate member and trip mechanism adapted to yieldingly retain the pole in the aforementioned position, a projection carried by the ear at an appreciable height above said pocket and adapted to be shifted for engagement with said pin to automatically release the ear and pole mounting from the trip mechanism when the pole leaves the trolley line, and means for lockingly engaging the plate member with the turn table.

In testimony whereof I affix my signature.

ANTON PRELESNIK.